United States Patent [19]

Reno

[11] Patent Number: 5,233,583
[45] Date of Patent: Aug. 3, 1993

[54] TRACKING AND READING SYSTEM FOR AN OPTICAL MEDIUM AND MEDIUM FOR USE THEREWITH

[75] Inventor: Charles W. Reno, Cherry Hill, N.J.

[73] Assignee: General Electric Company, Philadelphia, Pa.

[21] Appl. No.: 970,521

[22] Filed: Nov. 2, 1992

Related U.S. Application Data

[63] Continuation of Ser. No. 629,896, Dec. 19, 1990, abandoned.

[51] Int. Cl.⁵ ............................................. G11B 7/00
[52] U.S. Cl. .............................. 369/44.26; 369/111; 369/44.37
[58] Field of Search ............... 369/44.26, 275.1, 275.3, 369/275.4, 111, 110, 109, 44.37, 44.38, 277, 278, 279, 44.11

[56] References Cited

U.S. PATENT DOCUMENTS

| | | | |
|---|---|---|---|
| 4,290,122 | 9/1981 | Bates et al. | 369/44.26 |
| 4,385,303 | 5/1983 | Akahira et al. | 369/278 |
| 4,727,528 | 2/1988 | Wyland | 369/44.26 |

FOREIGN PATENT DOCUMENTS

| | | | |
|---|---|---|---|
| 3714804 | 11/1988 | Fed. Rep. of Germany | 369/275.4 |
| 0007244 | 1/1981 | Japan | 369/277 |
| 0126635 | 6/1986 | Japan | 369/109 |
| 0217428 | 9/1987 | Japan | 369/44.26 |
| 0125732 | 5/1989 | Japan | 369/44.11 |
| 0292744 | 12/1990 | Japan | 369/111 |

Primary Examiner—Andrew L. Sniezek
Assistant Examiner—Thang V. Tran
Attorney, Agent, or Firm—Geoffrey H. Krauss

[57] ABSTRACT

An optical disk includes a spiraling guide track embedded in a surface of the disk on either side of which is positioned a different information track. Apparatus for both tracking and reading the disk includes a source providing two light beams directed to the disk surface and spaced apart such as to nominally illuminate respective ones of the information tracks and part of the intermediate guide track. Detectors are positioned to receive reflected light from the disk to both provide signals corresponding to information on the disk and to track the beams relative to the disk so that they are located properly with respect to the location of the information tracks on the disk.

3 Claims, 4 Drawing Sheets

TRACKING AND READING SYSTEM FOR AN OPTICAL MEDIUM AND MEDIUM FOR USE THEREWITH

This application is a continuation of application Ser. No. 07/629,896, filed Dec. 19, 1990 now abandoned.

BACKGROUND OF THE INVENTION

1. Field of the Invention

This invention is concerned with an optical disk memory system including a disk medium which has multiple information tracks alternating with single guide tracks and is concerned with apparatus for tracking and reading/writing information from the disk.

2. Description of the Prior Art

There are a number of known systems for reading and tracking information on optical disks or other optical media. In relatively more sophisticated systems, disks or other media of the contemplated type typically have information tracks which alternate with guide tracks as viewed along a radial line. The "tracks", information and guide, may each, in fact, be a single track in the optical disk which spirals around the disk from a location near to the disk axis location to a location remote therefrom much as the groove in a conventional audio record. In some relatively simple optical media systems, the information track and guide track are the same.

All such systems involve means for servoing or tracking along the guide track so that information is correctly read from the information track. The guide tracks in the optical medium are typically raised above or depressed into the medium surface by an amount which is typically $\lambda/8n$ to $\lambda/4n$ where $\lambda$ is the wavelength of an impinging light beam and n is the index of refraction of the media of propagation. Typical tracking systems involve the use of one tracking beam or two tracking beams which may be produced from one beam source. The illuminating beam is typically focused by a lens to a spot size whereby when the beam is centered over a track, 50% of the beam's power is in the track. Because of the approximate $\lambda/4n$ wavelength step between the track and remainder of the medium surface, the power of the reflected beam when centered over a track is substantially reduced at the center of the pattern relative to the power of the beam applied to the medium and the power collected by the illuminating lens is similarly reduced.

One or two detectors are appropriately positioned to receive the reflected power and are applied to a servoing means to move the tracking beam to be centered on the guide track. A reading means is coupled to the means producing the illumination beam to thus be positioned over the information track which lies beside and a given distance from the guide track. In a conventional two-spot tracking system (which really involves a third spot for reading information), two illumination beams are provided though there may, in fact, only be one illumination source. In a two-spot tracker the two beams or spots are typically offset by an amount such that their 50% power levels just touch an imaginary line parallel to the tracks. As each of the beams passes over a guide track, due to the cancellation of signal caused by the approximately $\frac{1}{4}$n wavelength depression or rise of the guide track, there is a much reduced signal. Electrical circuitry is then provided to subtract the return signal from one beam from the return signal from the other beam to produce a single sine wave or S curve having the center of the S curve mark the position when the two beams are an equal distance on either side of the center line of a guide track.

SUMMARY OF THE INVENTION

In accordance with the present invention, an optical disk medium which includes, as viewed along a radial thereof, a surface with guide tracks, each of which is flanked on either side by an information track that is not an information track flanking any other guide track as viewed along a radial of the disk. The apparatus includes means directing two focussed light beams to the surface, with each beam positioned nominally to illuminate a different one of the pair of flanking information tracks and a part of the intermediate guide track, and means responsive to reflected light from the surface for both positioning the light beams relative to the guide track and also for reading information from the two flanking information tracks.

DETAILED DESCRIPTION

Figure 1:
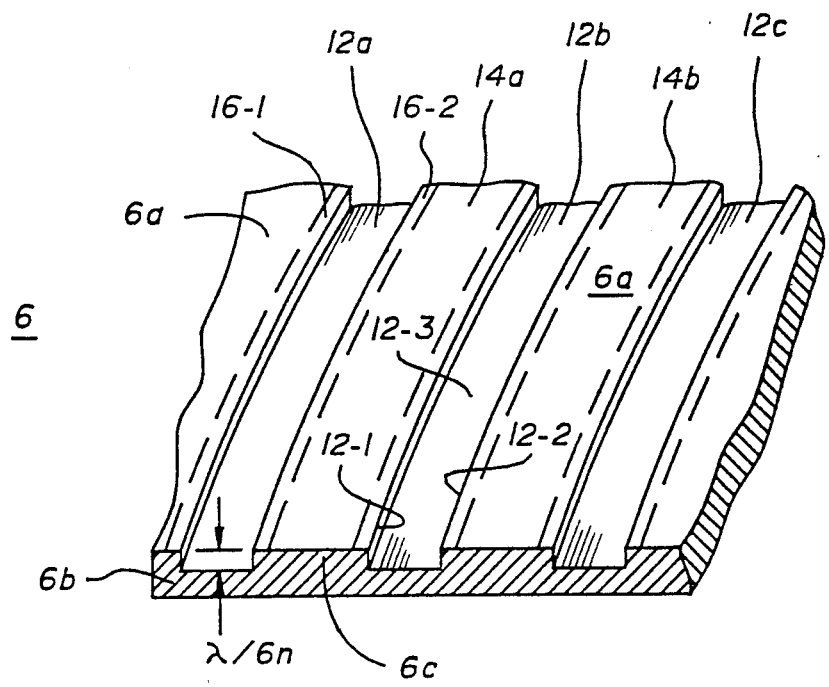
FIG. 1 illustrates an optical disk in accordance with the prior art.

Referring first to FIG. 1, there is illustrated a broken away portion of a prior art optical disk 6. In the foreground the break is along a radial thereof. Many different forms of optical disks 6 are known. Thus, there are optical disks of the read-only, write-once/read-many, erasable, and the like forms. Information readout by reflection from formations, magneto-optical processes, and the like from such disks are all contemplated. Disk 6 has a reflective upper surface 6a with preformatted guide tracks 12 (three, 12a, 12b, and 12c being shown) machined or otherwise formed in substrate 6b thereof. The guide tracks 12 alternate with information tracks 14 (two, 14a and 14b, being shown). The information tracks are imaginary regions in a layer 6c atop substrate 6b and below surface 6a in which layer magneto-optic domains can be formed (written), recognized (read), and rewritten (erased) although other forms can also be utilized. In point of fact, guide tracks 12 and information tracks 14 may each simply be one continuous track, spiraling outward from a central axis (not shown) which would be to the right of disk 6 as illustrated in FIG. 1. Although guide tracks 12 are illustrated as being depressed in FIG. 1, they may, in fact, be raised or, said another way, information tracks 14 may be lowered or depressed into the disk surface 6a.

The guide tracks, if they are depressed, and typically they are, are machined or replicated into surface 6a at the time of manufacture of the disk. Because the forming process is not perfect, the edges such as 12-1 and 12-2 of the guide tracks and bottom 12-3 tend to be rough. As such, it is known in the prior art to provide a small guard space between the guide tracks 12 and the information tracks 14 as indicated by dashed lines 16-1 and 16-2 to allow the spot intensity to decrease before the edge of the guide track is encountered thus decreasing crosstalk.

Exemplary, though not limiting dimensions for disk 6, are to have guide tracks of approximately 0.6 micrometers ($\mu$m), information tracks of approximately 0.8 $\mu$m micrometers and the spacing between the guide tracks and the information tracks of approximately 0.1 $\mu$m. Thus, it will be understood that information tracks are 0.8 $\mu$m apart, or the full width of an information track apart, and that the track-to-track (information track-to-information track or guide track-to-guide track) spacing is typically 1.6 $\mu$m.

For reasons which will become evident as the discussion proceeds, the depth of guide track 12 below surface 6a is somewhat critical. For tracking purposes it is desirable that the depth of track 12 be $\lambda/8n$, where $\lambda$ is the wavelength of an impinging light source to be described hereinafter and n is the index of refraction of the media of propagation. An exemplary value of $\lambda$ is 830 nm and an exemplary value of n is 1.5. For information reading purposes it is desirable that the depth be $\lambda/4n$. As a compromise, typically the depth is made $\lambda/6n$.

Figure 2:
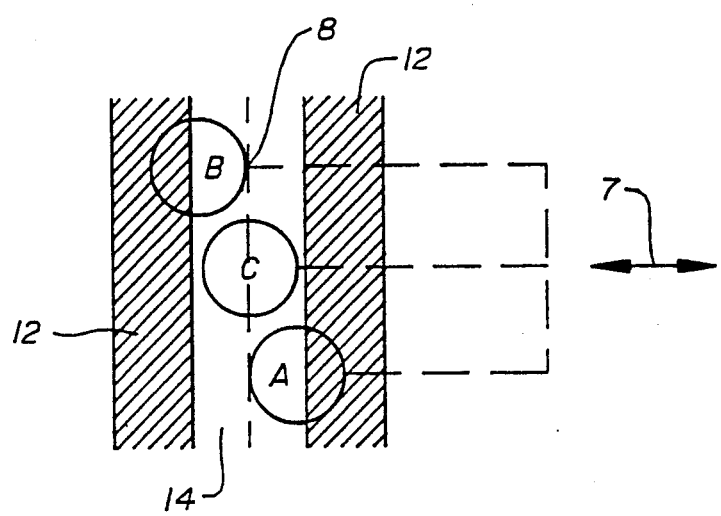
FIG. 2 illustrates a two light beam tracker for use with the disk of FIG. 1 in accordance with the prior art.

A typical prior art so-called "two spot" tracker is illustrated in FIG. 2, to which attention is now directed. In reality there are three focussed illumination spots labelled A, B, and C all from a source (not shown) and all directed toward surface 6a and normal thereto. Spots A and B are utilized for tracking. Spot C is used solely for reading, writing or erasing information in such a system. It should be understood that the various spots A, B, and C are not shown to the diameter of their full power, but rather shown to the diameter of half power. The half power dimension of spots A and B is typically equal to the width of an information track. The illumination spots are mechanically coupled together to be moved as indicated by arrow 7 in directions normal to the tracks (12 and 14) directions. At the indicated 50% power level the spots touch a common line 8 parallel to the tracks and spot C is centered on that line.

Figure 3:
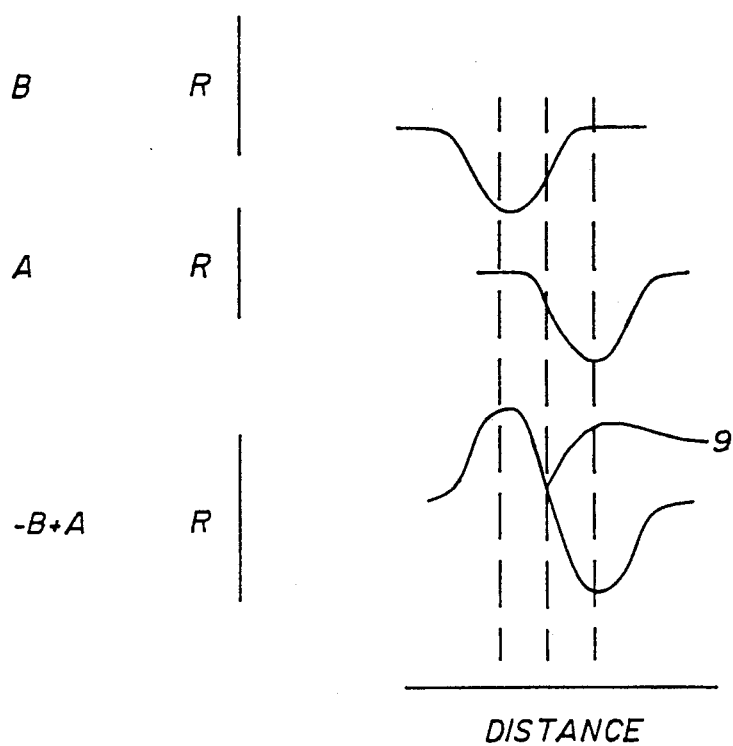
FIG. 3 is a set of waveforms for use in understanding the way in which tracking occurs with the disk of FIG. 1 in accordance with the prior art.

When a spot such as A is half over an information track 14 and half over a guide track 12, reflected light as measured by a detector (not shown) which is functionally positioned along a line normal to surface 6a and in line with spot A is at a minimum due to diffraction caused by the $\lambda/6n$ depth of the guide track. This is illustrated in FIG. 3, as waveform A where distance is on the horizontal axis and response (R) is on the vertical axis. If spot A moves either left or right from a position centered half over guide track 12 and half over information track 14, as illustrated, the reflected light increases. A similar statement applies to spot B the reflection of which is identical in shape to that of spot A only displaced therefrom. The lower waveform in FIG. 3 is the summation of waveform A with the inverse of waveform B. With spots A and B as illustrated in FIG. 2, a zero crossing occurs at point 9 in the bottom waveform of FIG. 3. Known servoing techniques can be used to position spots A and B so that spot C is centered over information track 14.

Figure 4:
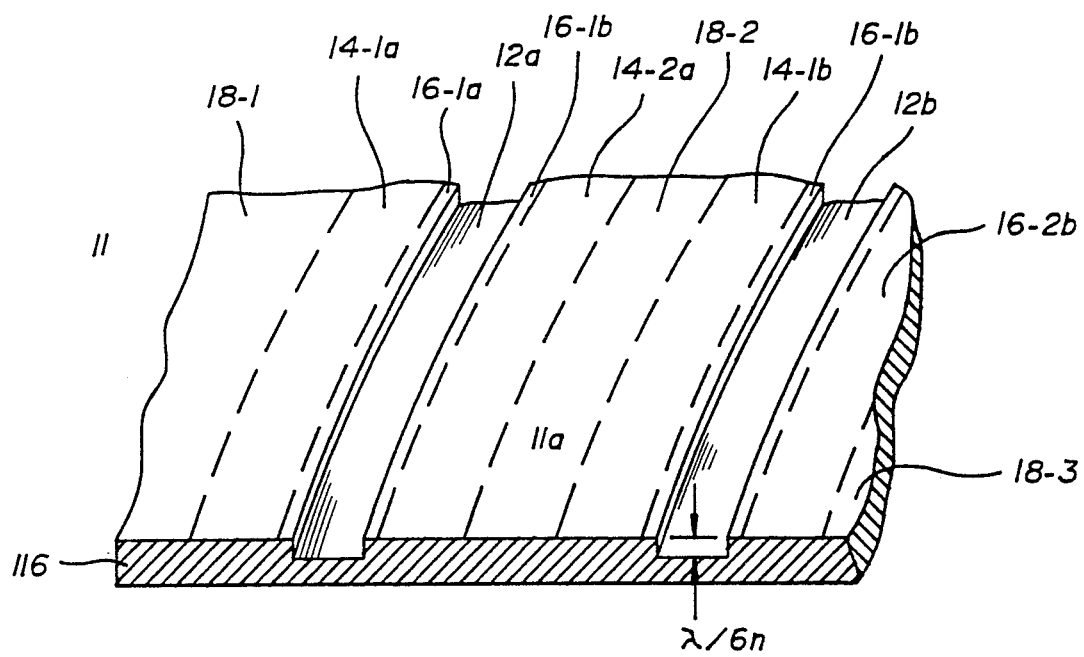
FIG. 4 illustrates an optical disk in accordance with the present invention.

Referring now to FIG. 4, there is shown a broken away portion of an optical disk 11 in accordance with the present invention. As with the disk 6 of FIG. 1, the foreground break is along a radial. As with the disk 6 in FIG. 1 there is a top surface 11a, similar to surface to 6a, of a substrate 11b similar to substrate 6b. There are guide tracks 12, two, 12a and 12b being shown by way of example, and there are information tracks 14. It will be noted, however, that in FIG. 4 there are, in fact, with two tracks information tracks 14 between successive guide tracks 12. Or said another way, there is an information track 14 flanking each guide track 12 that is not in common with any information track 14 that flanks any other guide track 12 as viewed along a radial of the disk. Thus, by way of example, information tracks 14-1a and 14-2a flank guide track 12a while information tracks 14-1b and 14-2b flank guide track 12b. As with the disk of FIG. 1, there may be a single guide track 12 and two flanking information tracks 14 which spiral outward relative to a central disk axis not shown but which would be to the right in FIG. 4.

As was mentioned in connection with FIG. 1, it is desirable to have a guard band between successive information tracks. In FIG. 1, the guard band was provided by the guide track plus a small space on either side of each guide track. In FIG. 4, however, because there are two information tracks between each successive pair of guide tracks, an additional spacing portion is needed. Thus, between successive information tracks there is either a guard track 18 such as 18-1, 18-2, and 18-3 or a guide track 12 plus adjacent areas 16.

As with the disk of FIG. 1, exemplary though not limiting dimensions are 0.6 $\mu$m for each guide track 12 plus a small guard track of 0.1 $\mu$m on either side thereof, 0.8 $\mu$m for each information track 14, and also 0.8 $\mu$m for each guard track 18. Thus, an exemplary guide track-to-guide track spacing is on the order of 3.2 $\mu$m. As with the disk of FIG. 1, the depth of the guide tracks is ideally $\lambda/8n$ for tracking purposes and $\lambda/4n$ for information reading and writing purposes. So, again, a good compromise is a depth of $\lambda/6n$.

Figure 5:
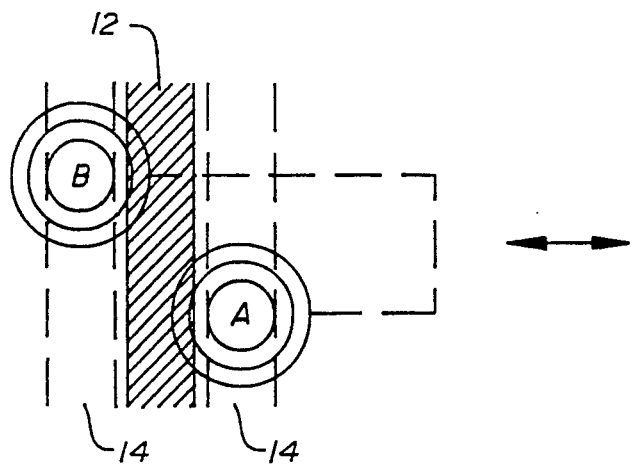
FIG. 5 illustrates a two light beam tracker for use with the disk of FIG. 4 in accordance with the present invention.

Referring now to FIG. 5, tracking spots A and B are similar to tracking spots A and B in FIG. 2 and are identical in shape to each other except that their spacing is such with reference to a line (not shown) normal to the track direction that when properly positioned they are centered over two information tracks 14 flanking a guide track 12. The spots are mechanically coupled together to be moved in directions indicated by arrow 7 normal to tracks 12 and 14. In FIG. 5, the innermost circle represents the 50% power level of illumination and successive larger circles represent power levels at 25% and somewhat greater than 0%, respectively. It will be noted that at the 25% and at the somewhat greater than 0% power levels that the light beam does extend into the intermediate guide track 12.

Figure 6:
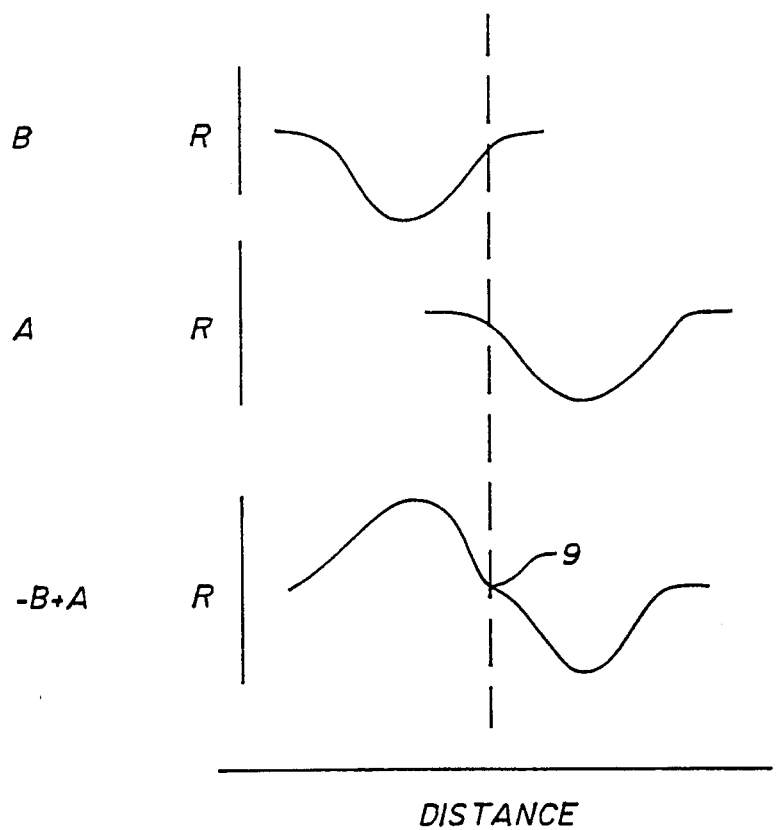
FIG. 6 is a set of waveforms for use in understanding the way in which tracking occurs with the disk of FIG. 4.

With reference now to FIG. 6, the waveforms A and B correspond to responses received back from disk 11 as the spots track across the disk in the directions indicated by arrow 7. The waveform indicated as $-B+A$ is the sum of waveform A and the negative of waveform B and differs from the equivalent waveform in FIG. 3 because the spacing of spots A and B are further apart than are spots A and B in FIG. 2. Nevertheless, in the $-B+A$ waveform in FIG. 6 there is a pronounced null at point 9 which, as with the prior art, can be used to center spots A and B with regard to the center of a guide track 12. However, unlike the prior art, spots A and B are also properly positioned to read, write, or erase information from information tracks 14. Thus, unlike the prior art in which a third spot, C, is required, no third spot is required with the present invention.

Figure 7:
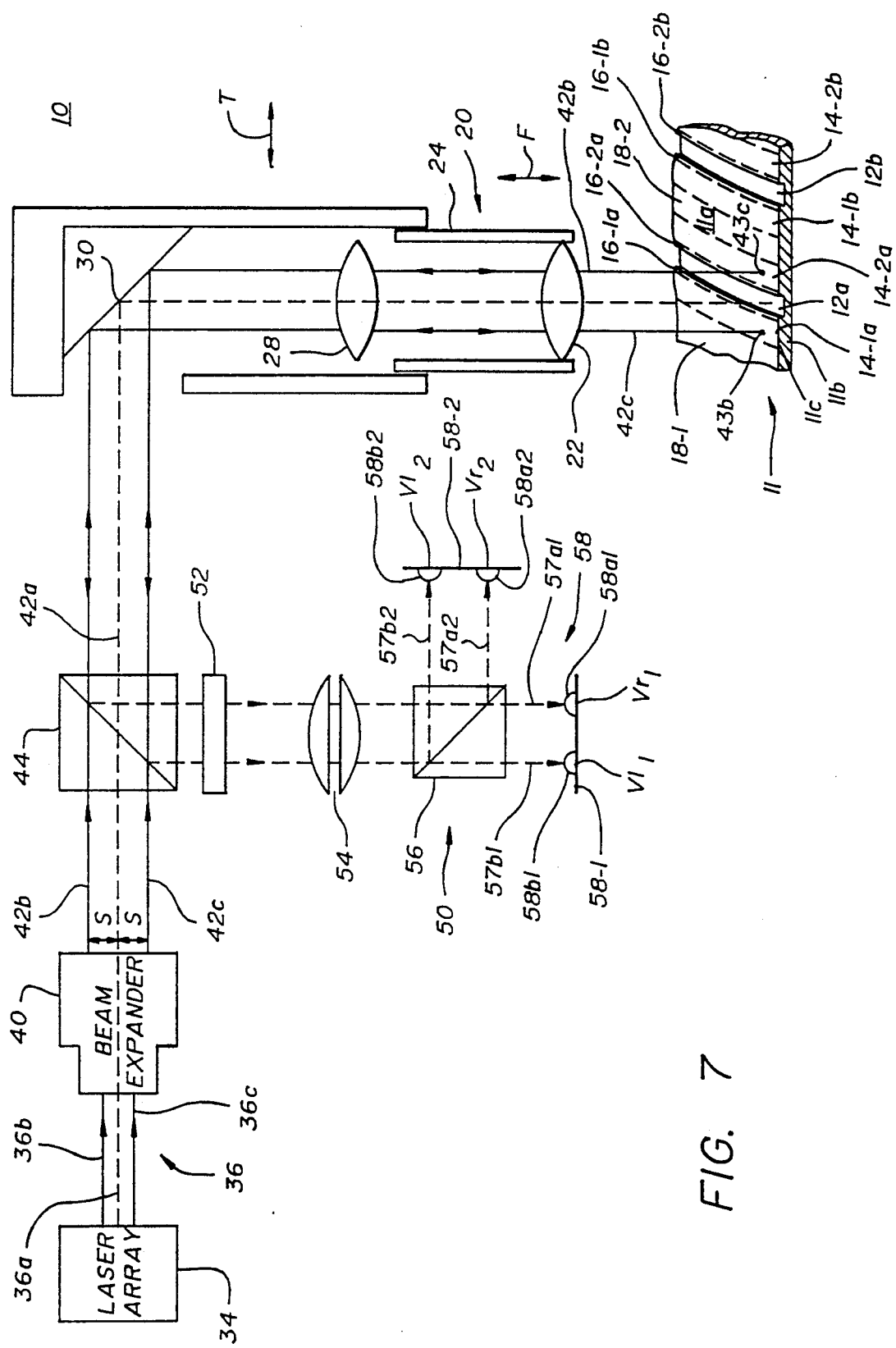
FIG. 7 is an optical disk reading and tracking system for use with the optical disk of FIG. 4.

A system 10 for tracking and reading/writing/erasing in accordance with the present invention is illustrated in FIG. 7 to which attention is now directed. Disk 11 is identical to disk 11 in FIG. 4. That portion of system 10 closest to disk 11 is a tracking and focus assembly 20 which includes a first lens means 22, carried by a mechanically movable member 24, movable for focusing purposes toward and away from the disk surface, in the directions of arrows F. Member 24 is movable, by means well known but not shown, with respect to another member 26 which is itself movable in a radial direction with respect to the disk, and transverse to the focusing direction of arrows F, as shown by transverse arrows T. Member 26 may carry additional lens means 28 and means 30 for redirecting the light beams impinging upon, or reflected from, disk 11.

As is well known in the art, optical assemblies in this form can be utilized to radially move from track to track of the disk, while still focusing the various light beams and changing the direction thereof. Thus, a group of substantially parallel light beams generally labelled 36, symmetrical about a central axis 36a, are provided by an array of illumination sources 34, such as a laser diode array and the like, with the illumination source producing beams 36b and 36c symmetrical about central axis portion 36a.

The substantially parallel, collimated beams 36b and 36c may be passed through a beam expansion means 40 to provide a set of output beams 42b and 42c about central axis portion 42a equal in number to the input beams 36b and 36c, but having smaller angular spacings S relative to axis portion 42a. The distance between the focussed beams 42b and 42c measured along a radial of the disk is determined by rotation of laser array 34 about the line of travel of beams 36b and 36c. Axis 42a is coextensive with axis 36a. Beams 42b and 42c impinge upon the disk 11 surface as spots 43b and 43c with a spacing equal to the information track-to-information track spacing which for the exemplary disk is 1.6 μm. The spots are reflected therefrom and pass back through lenses 22 and 28, are redirected by means 30, enter a beam splitting means 44 and are reflected to pass into a reading means 50.

For reading a magneto-optic disk (M-O), beam splitter 44 must be polarized and light source 34 must produce linearly polarized light, a small percent in amplitude of which is directed through beam splitter 44 to reading means 50. Means 50 may include a quarter-wave plate 52, lens means 54, a Wollaston polarized prism 56 and the like for focusing two pairs of spaced apart read beams 57a1/57b1 and 57a2/57b2, respectively, upon first and second pairs 58a1/58b1 and 58a2/58b2 of detectors elements 58-1 and 58-2 of a solid state optical detection means 58. Each of the detector elements provides a separate electrical output signal, e.g. detector element 58a1 providing an output signal Vr1 and separate detector 58a2 providing a separate output signal Vr2, both for the left information tracks such as 14-1a, while detector elements 58b1/58b2 provide separate output signals Vl1 and Vl2 for the right information tracks such as 14-2a, all as viewed in FIG. 7.

The track recovered information signal is the difference between the formation output signals, e.g. left track information is (Vl1-Vl2), and right track information is (Vr1-Vr2). Further detail of one read process may be found, e.g. in Challener and Rinehart, "Jones Matrix Analysis of Magneto-Optical Media and Read-Back Systems," *Applied Optics*, Vol. 26, No. 12, pp. 3974–3980, (Sep. 15, 1987). An archival disk can be processed in an identical way except that only elements 58a1 and 58b1(or 58b2 and 58a2) are employed and the light beams need not be polarized.

In accordance with the invention, the same output signals are also used for centering axis 42a over guide track 12 such as guide track 12a. This is accomplished by subtracting the sum of Vr1 and Vr2 from λ the sum of Vl1 and Vl2. The resultant value, if not 0, is used by feedback means well known to the art, to move assembly 20 in the direction of arrows to reacquire central guide track 12 and thus to position beams 42b and 42c over information tracks on either side of the central guide track 12. Thus, the system 10 just described using just two light spots can both track and read/write/erase. It will be understood that the reading, writing, and erasing functions are performed by a combination of the power produced by laser array 34 and the presence or absence of magnetic field (not shown) at disk 11 all as is well known to the practitioners in the art.

What is claimed is:

1. A tracking and reading system for an optical medium, said system comprising:
   an optical disk comprising:
      a substrate with a central axis;
      a guide track formed on said substrate and spiraling outward from a position relatively close to said central axis of said disk to a position relatively close to an outer edge of said disk; and
      a pair of information tracks, with one information track being formed on either side of said spiraling guide track and not flanked by another guide track; and
   apparatus for reading and tracking the optical disk, comprising:
      means directing each different one of only a pair of focussed polarized light beams to said disk surface;
      means for positioning each beam to continuously nominally illuminate a different one of said flanking information tracks and at least part of the intermediate guide track; and
      means, responsive to a portion of each of said pair of beams being reflected from said surface, for simultaneously detecting amplitudes of both phase components of a reflected beam from each different one of said flanking information tracks to recover separate amplitude signals $V_{l1}$ and $V_{l2}$ for a first one of said flanking information tracks and separate amplitude signals $V_{r1}$ and $V_{r2}$ for a second one of said flanking information tracks, for simultaneously providing continuous position information, as a difference of each track amplitude signal sum (i.e. $(V_{l1}+V_{l2})-(V_{r1}+V_{r2})$) of the light beams relative to of flanking information tracks to cause each of said beams to track substantially the center of the information track on which that beam is directed, and for providing, as a first difference signal $(V_{l1}-V_{l2})$ for the first track and as a second difference signal $(V_{r1}-V_{r2})$ for the second track, information data simultaneously from both of said two flanking information tracks.

2. The system as set forth in claim 1 wherein said directing means includes a laser array.

3. The system as set forth in claim 2 wherein said laser array comprised two light-emitting diodes, each producing a different one of said beam.

* * * * *